US012704636B2

(12) United States Patent
Saito

(10) Patent No.: US 12,704,636 B2
(45) Date of Patent: Aug. 11, 2026

(54) INFORMATION MANAGEMENT SYSTEM, CENTER, INFORMATION MANAGEMENT METHOD, AND STORAGE MEDIUM

(71) Applicant: DENSO CORPORATION, Kariya-city (JP)

(72) Inventor: Ryota Saito, Kariya-city (JP)

(73) Assignee: DENSO CORPORATION, Kariya-city (JP)

(*) Notice: Subject to any disclaimer, the term of this patent is extended or adjusted under 35 U.S.C. 154(b) by 223 days.

(21) Appl. No.: 18/763,323

(22) Filed: Jul. 3, 2024

(65) Prior Publication Data

US 2024/0353567 A1 Oct. 24, 2024

Related U.S. Application Data

(63) Continuation of application No. PCT/JP2022/043382, filed on Nov. 24, 2022.

(30) Foreign Application Priority Data

Jan. 5, 2022 (JP) ................................ 2022-000517

(51) Int. Cl.
*G01S 19/07* (2010.01)
*G01S 19/42* (2010.01)

(52) U.S. Cl.
CPC ............ *G01S 19/071* (2019.08); *G01S 19/42* (2013.01)

(58) Field of Classification Search
CPC ............................... G01S 19/071; G01S 19/42
USPC ......................................................... 342/352
See application file for complete search history.

(56) References Cited

U.S. PATENT DOCUMENTS

2013/0116908 A1 5/2013 Oh et al.
2018/0364366 A1 12/2018 Cvijetic et al.
2020/0150285 A1 5/2020 Cvijetic et al.
2022/0090929 A1 3/2022 Shihoya et al.
(Continued)

FOREIGN PATENT DOCUMENTS

JP 2004-280320 A 10/2004
JP 2008286986 A 11/2008
JP 2010019588 A 1/2010
(Continued)

*Primary Examiner* — Harry K Liu
(74) *Attorney, Agent, or Firm* — Harness, Dickey & Pierce, P.L.C.

(57) ABSTRACT

The information management system includes a first vehicle, a second vehicle, and a center. The information management system manages information provided from the center to a user. The center performs the following processes. The center receives first vehicle information and second vehicle information. The center acquires correction information indicating a difference between the second GNSS position information and the high-precision position information. The second GNSS position information and the high-precision position information are included in the second vehicle information. The center calculates corrected position information indicative of the position of the first vehicle using the first GNSS position information included in the first vehicle information and the correction information. The corrected position information has a higher accuracy than an accuracy of the first GNSS position information The center records the corrected position information.

9 Claims, 8 Drawing Sheets

(56) References Cited

U.S. PATENT DOCUMENTS

2022/0299657 A1 9/2022 Cvijetic et al.
2023/0152472 A1* 5/2023 Wang ...................... G01S 19/40
342/357.23

FOREIGN PATENT DOCUMENTS

JP 2013101100 A 5/2013
JP 2019526032 A 9/2019
JP 2020046219 A 3/2020
JP 2020180857 A 11/2020
JP 2020204531 A 12/2020
JP 2021103169 A 7/2021
WO WO-2022001278 A1 * 1/2022 .............. H04W 4/40

* cited by examiner

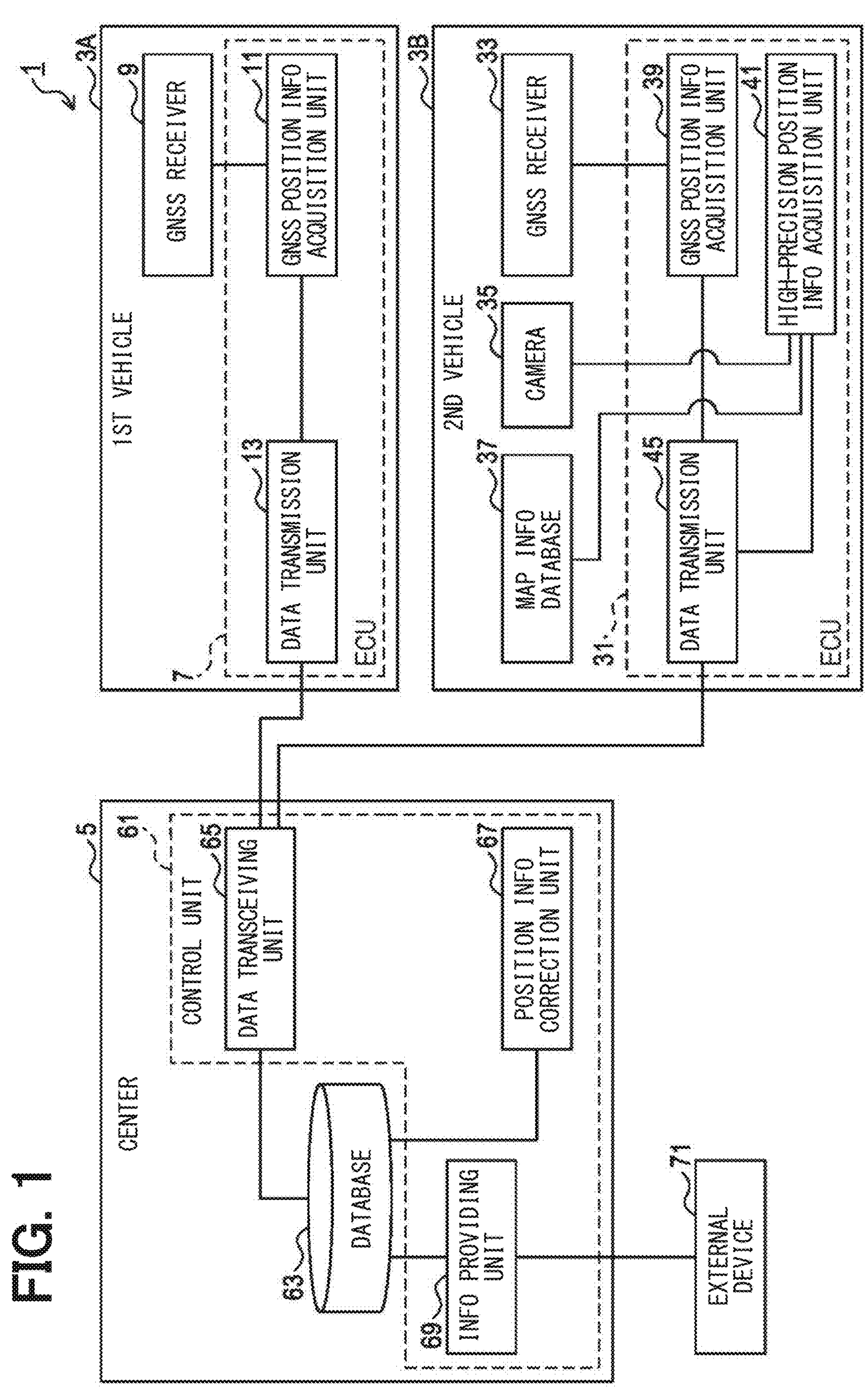
FIG. 1
1
3A
1ST VEHICLE
9
GNSS RECEIVER
11
GNSS POSITION INFO ACQUISITION UNIT
13
DATA TRANSMISSION UNIT
7
ECU
3B
2ND VEHICLE
33
GNSS RECEIVER
35
CAMERA
37
MAP INFO DATABASE
39
GNSS POSITION INFO ACQUISITION UNIT
41
HIGH-PRECISION POSITION INFO ACQUISITION UNIT
45
DATA TRANSMISSION UNIT
31
ECU
5
CENTER
61
CONTROL UNIT
65
DATA TRANSCEIVING UNIT
67
POSITION INFO CORRECTION UNIT
63
DATABASE
69
INFO PROVIDING UNIT
71
EXTERNAL DEVICE

| | POSITION INFO TYPE | LATITUDE | LONGITUDE |
|---|---|---|---|
| 15B | 2ND GNSS POSITION INFO | 34.9945000 | 137.0057000 |
| 51 | HIGH-PRECISION POSITION INFO | 34.9946000 | 137.0058000 |
| 73 | CORRECTION INFO | 0.0001000 | 0.0001000 |

| | POSITION INFO TYPE | LATITUDE | LONGITUDE |
|---|---|---|---|
| 15A | 1ST GNSS POSITION INFO | 34.9947000 | 137.0058000 |
| 75 | CORRECTED POSITION INFO | 34.9946000 | 137.0057000 |

INFORMATION MANAGEMENT SYSTEM, CENTER, INFORMATION MANAGEMENT METHOD, AND STORAGE MEDIUM

CROSS REFERENCE TO RELATED APPLICATIONS

The present application is a continuation application of International Patent Application No. PCT/JP2022/043382 filed on Nov. 24, 2022, which designated the U.S. and claims the benefit of priority from Japanese Patent Application No. 2022-000517 filed on Jan. 5, 2022. The entire disclosures of all of the above applications are incorporated herein by reference.

TECHNICAL FIELD

The present disclosure relates to an information management system, a center, an information management method, and a storage medium.

BACKGROUND

Conventionally, a vehicle movement data analysis system stores movement data collected by a vehicle in a storage device of the same vehicle. The vehicle movement data analysis system corrects the movement data based on correction information.

SUMMARY

The present disclosure provides an information management system. The information management system includes a first vehicle, a second vehicle, and a center. The information management system manages information provided from the center to a user. The first vehicle includes a first vehicle information transmission unit configured to transmit, to the center, first vehicle information including first global navigation satellite system (GNSS) position information indicative of a position of the first vehicle. The second vehicle includes a second vehicle information transmission unit configured to transmit, to the center, second vehicle information including second GNSS position information indicative of a position of the second vehicle and high-precision position information indicative of the position of the second vehicle. The high-precision position information has a higher accuracy than an accuracy of the second GNSS position information. The center includes: a vehicle information receiving unit receiving the first vehicle information transmitted from the first vehicle information transmission unit and the second vehicle information transmitted from the second vehicle information transmission unit; a correction information acquisition unit acquiring correction information that indicates a difference between the second GNSS position information and the high-precision position information, the second GNSS position information and the high-precision position information are included in the second vehicle information received by the vehicle information receiving unit; a correction unit calculating corrected position information indicative of the position of the first vehicle using the first GNSS position information included in the first vehicle information received by the vehicle information receiving unit and the correction information acquired by the correction information acquisition unit, the corrected position information has a higher accuracy than an accuracy of the first GNSS position information; a recording unit recording the first vehicle information, the second vehicle information, and the corrected position information calculated by the correction unit; and an information providing unit transmitting, to an external device that is usable by the user, the information recorded in the recording unit in response to a request from the user.

BRIEF DESCRIPTION OF DRAWINGS

Objects, features and advantages of the present disclosure will become apparent from the following detailed description made with reference to the accompanying drawings. In the drawings:

FIG. 1 is a block diagram illustrating a configuration of an information management system;

DETAILED DESCRIPTION

Figure 2:
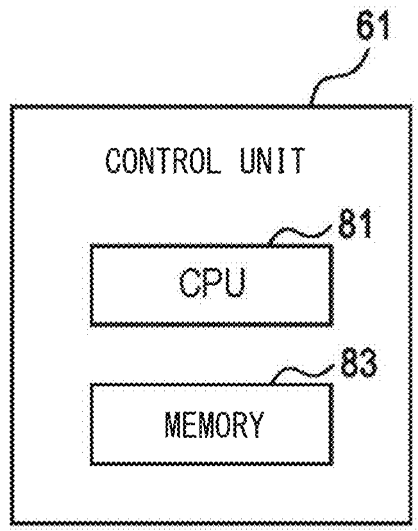
FIG. 2 is a block diagram illustrating a configuration of a control unit.

Inventors of the present disclosure found out the following issues. It is conceivable that information to be provided to users may be managed by an information management system that includes multiple vehicles and a center. The user refers to a user who uses the provided information. The center collects information from multiple vehicles and records the collected information. The center provides the collected information to the users. The information provided to the users includes, for example, vehicle position information.

For the users, it is preferable that the provided position information has a high accuracy. In a related art, when correcting the position information, it is necessary to provide each vehicle with a configuration for correcting the position information.

According to an aspect of the present disclosure, the information management system includes a first vehicle, a second vehicle, and a center. The information management system manages information provided from the center to a user.

The first vehicle includes a first vehicle information transmission unit configured to transmit, to the center, first vehicle information including first GNSS position information indicative of a position of the first vehicle.

The second vehicle includes a second vehicle information transmission unit configured to transmit, to the center, second vehicle information including second GNSS position information indicative of a position of the second vehicle and high-precision position information indicative of the position of the second vehicle. The high-precision position information has a higher accuracy than an accuracy of the second GNSS position information.

The center includes: a vehicle information receiving unit receiving the first vehicle information transmitted from the first vehicle information transmission unit and the second vehicle information transmitted from the second vehicle information transmission unit; a correction information acquisition unit acquiring correction information that indicates a difference between the second GNSS position information and the high-precision position information, the second GNSS position information and the high-precision position information are included in the second vehicle information received by the vehicle information receiving unit; a correction unit calculating corrected position information indicative of the position of the first vehicle using the first GNSS position information included in the first vehicle information received by the vehicle information receiving unit and the correction information acquired by the correction information acquisition unit, the corrected position information has a higher accuracy than an accuracy of the first GNSS position information; a recording unit recording the first vehicle information, the second vehicle information, and the corrected position information calculated by the correction unit; and an information providing unit transmitting, to an external device that is usable by the user, the information recorded in the recording unit in response to a request from the user.

The information management system according to an aspect of the present disclosure can record highly accurate corrected position information without necessarily correcting the GNSS position information in each of the first vehicles when there are multiple first vehicles.

According to another aspect of the present disclosure, a center receives information transmitted from a first vehicle and a second vehicle and manages information to be provided to a user.

The first vehicle is configured to transmit, to the center, first vehicle information including first GNSS position information indicative of a position of the first vehicle.

The second vehicle is configured to transmit, to the center, second vehicle information including second GNSS position information indicative of a position of the second vehicle and high-precision position information indicative of the position of the second vehicle. The high-precision position information has a higher accuracy than an accuracy of the second GNSS position information.

The center includes: a vehicle information receiving unit receiving the first vehicle information transmitted from the first vehicle and the second vehicle information transmitted from the second vehicle; a correction information acquisition unit acquiring correction information, which indicates a difference between the second GNSS position information and the high-precision position information, the second GNSS position information and the high-precision position information being included in the second vehicle information received by the vehicle information receiving unit; a correction unit calculating corrected position information indicative of the position of the first vehicle using the first GNSS position information included in the first vehicle information received by the vehicle information receiving unit and the correction information acquired by the correction information acquisition unit, the corrected position information having a higher accuracy than an accuracy of the first GNSS position information; a recording unit recording the first vehicle information, the second vehicle information, and the corrected position information calculated by the correction unit; and an information providing unit transmitting, to an external device that is usable by the user, the information recorded in the recording unit in response to a request from the user.

The center according to another aspect of the present disclosure can record highly accurate corrected position information without necessarily correcting the GNSS position information in each of the first vehicles when there are multiple first vehicles.

According to another aspect of the present disclosure, an information management method collects information from a first vehicle and a second vehicle and manages information to be provided to a user.

The information management method includes: collecting, from the first vehicle, first vehicle information including first GNSS position information indicative of a position of the first vehicle; collecting, from the second vehicle, second vehicle information including second GNSS position information indicative of a position of the second vehicle and high-precision position information indicative of the position of the second vehicle, the high-precision position information having a higher accuracy than an accuracy of the second GNSS position information; acquiring correction information, which indicates a difference between the second GNSS position information and the high-precision position information, the second GNSS position information and the high-precision position information being included in the second vehicle information; calculating corrected position information indicative of the position of the first vehicle using the first GNSS position information included in the first vehicle information and the correction information, the corrected position information having a higher accuracy than an accuracy of the first GNSS position information; recording the first vehicle information, the second vehicle information, and the corrected position information; and in response to a request from the user, transmitting the first vehicle information, the second vehicle information, and the corrected position information, which are recorded, to an external device that is usable by the user.

The information management method according to another aspect of the present disclosure can record highly accurate corrected position information without necessarily correcting the GNSS position information in each of the first vehicles when there are multiple first vehicles.

The following will describe embodiments of the present disclosure with reference to the accompanying drawings.

First Embodiment

1. Configuration of Information Management System 1

The following will describe a configuration of information management system 1 with reference to FIG. 1 to FIG. 5. As shown in FIG. 1, the information management system 1 includes a first vehicle 3A, a second vehicle 3B, and a center 5. The number of first vehicles 3A may be one or more. The number of second vehicles 3B may be one or more.

The first vehicle 3A is equipped with an ECU 7 and a GNSS receiver 9. The ECU 7 functions as a GNSS position information acquisition unit 11 and a data transmission unit 13. The GNSS position information acquisition unit 11 uses the GNSS receiver 9 to acquire first GNSS position information 15A. The first GNSS position information 15A is information that indicates a position of the first vehicle 3A. The first GNSS position information 15A corresponds to position information, and is acquired by a GNSS (Global Navigation Satellite System).

Figure 3:
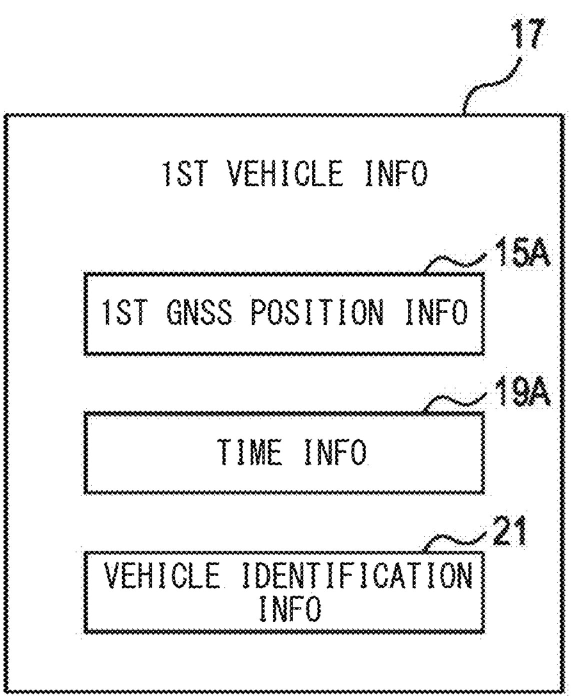
FIG. 3 is an explanatory diagram showing a configuration of first vehicle information.

The data transmission unit 13 transmits, to the center 5, first vehicle information 17 shown in FIG. 3. The first vehicle information 17 includes first GNSS position information 15A, time information 19A, and vehicle identification information 21. The time information 19A indicates the time when the first GNSS position information 15A is acquired.

The vehicle identification information 21 is used to identify the first vehicle 3A from the second vehicle 3B. The vehicle identification information 21 includes, for example, VIN (vehicle identification number) of the first vehicle 3A, manufacturer of the first vehicle 3A, a model name of the first vehicle 3A, manufacturing year of the first vehicle 3A, an equipment configuration of the first vehicle 3A, etc. The ECU 7 stores vehicle identification information 21 in advance.

The first vehicle information 17 may further include other information. Examples of other information include image information acquired by a camera equipped to the first vehicle 3A, vehicle signals, and sensor data generated by sensors other than the camera. The vehicle signal is, for example, a signal indicating a speed of the first vehicle 3A, a state of vehicle door, etc. Examples of sensors other than the camera may include lidar. The data transmission unit 13 corresponds to a first vehicle information transmission unit.

The functions of ECU 7 are implemented by the ECU 7 by executing a program stored in a non-transitory tangible storage medium. Further, by executing the program corresponding to the functions of ECU, a method corresponding to the program is executed. The ECU 7 may include one microcomputer or multiple microcomputers. The GNSS receiver 9 receives radio waves transmitted from satellites.

The second vehicle 3B is equipped with an ECU 31, a GNSS receiver 33, a camera 35, and a map information database 37.

The GNSS receiver 33 receives radio waves transmitted from satellites. The camera 35 can capture images of a periphery of the second vehicle 3B, and generate image information corresponding to captured images. The map information database 37 records the features of landmarks in association with absolute coordinates of the landmarks. Absolute coordinates are expressed on coordinate axes, which are fixed relative to the Earth. Absolute coordinates include, for example, coordinates expressed by latitude, longitude, and altitude. Examples of landmarks include traffic signs and white lines.

The ECU 31 functions as a GNSS position information acquisition unit 39, a high-precision position information acquisition unit 41, and a data transmission unit 45.

The GNSS position information acquisition unit 39 uses the GNSS receiver 33 to acquire second GNSS position information 15B. The second GNSS position information 15B indicates a position of the second vehicle 3B. The second GNSS position information 15B is position information, and is acquired by the GNSS.

The high-precision position information acquisition unit 41 acquires high-precision position information 51. The high-precision position information 51 indicates the position of second vehicle 3B at a time, which is close to the acquiring time of the second GNSS position information 15B. The high-precision position information 51 has a higher accuracy than the second GNSS position information 15B.

For example, the high-precision position information acquisition unit 41 acquires the high-precision position information 51 in the following manner. The high-precision position information acquisition unit 41 uses the camera 35 to capture images of a scenery around the second vehicle 3B and generate image information. Next, the high-precision position information acquisition unit 41 recognizes landmarks in the image information by performing image recognition. Next, the high-precision position information acquisition unit 41 compares the recognized landmark with the map information database 37, and acquires the absolute coordinates of landmark recognized in the image information. Next, the high-precision position information acquisition unit 41 calculates the relative position of the second vehicle 3B relative to the landmark, based on the position of landmark in the image information. Next, the high-precision position information acquisition unit 41 calculates the absolute coordinates of second vehicle 3B based on the absolute coordinates of the landmark and the relative position of the second vehicle 3B relative to the landmark. The calculated information indicating the absolute coordinates of the second vehicle 3B is used as the high-precision position information 51.

Figure 4:
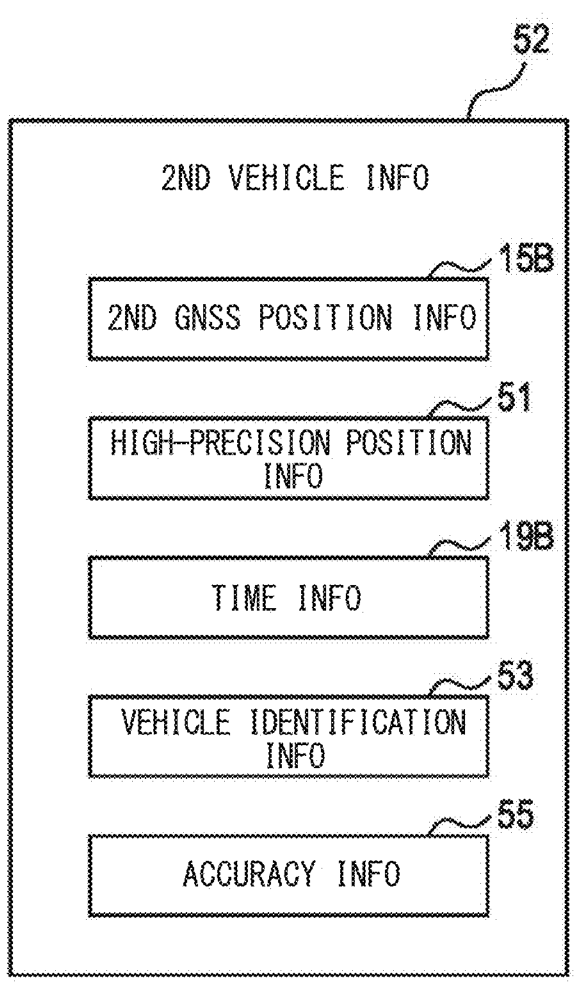
FIG. 4 is an explanatory diagram showing a configuration of second vehicle information.

The data transmission unit 45 transmits, to the center 5, second vehicle information 52 shown in FIG. 4. The second vehicle information 52 includes second GNSS position information 15B, high-precision position information 51, time information 19B, vehicle identification information 53, and accuracy information 55. The second vehicle information 52 may further include other information. Examples of other information include image information acquired by the camera 35, vehicle signals, and sensor data generated by sensors other than the camera 35. The vehicle signal is, for example, a signal indicating a speed of the second vehicle 3B, a state of vehicle door, etc. Examples of sensors other than the camera 35 include a lidar.

The time information 19B indicates the time when the second GNSS position information 15B and the high-precision position information 51 are acquired. The vehicle identification information 53 is used to identify the second vehicle 3B from the first vehicle 3A. The vehicle identification information 21 includes, for example, a VIN of the second vehicle 3B, a manufacturer of the second vehicle 3B, a model name of the second vehicle 3B, manufacturing year of the second vehicle 3B, an equipment configuration of the second vehicle 3B, etc. The ECU 31 stores the vehicle identification information 53 in advance.

The accuracy information 55 indicates the accuracy of second GNSS position information 15B or the accuracy of high-precision position information 51. For example, the accuracy information 55 indicates low accuracy when the GNSS radio wave reception state is worse at the acquiring time of the second GNSS position information 15B. For example, when a location where the second vehicle 3B is traveling at the acquiring time of the high-precision position information 51 has no high-precision map recorded in the map information database 37, the accuracy indicated by the accuracy information 55 is lower than a case where the location is recorded in the high-precision map.

For example, the accuracy indicated by the accuracy information 55 has two types: "Accuracy: Low" and "Accuracy: High". When the second GNSS position information 15B or the high-precision position information 51 is acquired in a situation where accuracy is low as described above, the accuracy indicated by the accuracy information 55 is "Accuracy: Low". In other cases, the accuracy indicated by the accuracy information 55 is "Accuracy: High".

For example, the accuracy information 55 includes a numerical value (hereinafter referred to as an accuracy value) that changes depending on a level of accuracy. For example, the accuracy value increases an increase of the level of accuracy. The accuracy value may be a value that varies corresponding to the precision, for example, within a range of 0 to 1. The data transmission unit 45 corresponds to a second vehicle information transmission unit.

The functions of ECU 31 are implemented by the ECU 31 by executing a program stored in a non-transitory tangible storage medium. Further, by executing the program corresponding to the functions of ECU, a method corresponding to the program is executed. The ECU 31 may include one microcomputer or multiple microcomputers.

The center 5 includes a control unit 61 and a database 63. The control unit 61 functions as a data transceiving unit 65, a position information correction unit 67, and an information providing unit 69. The center 5 and an external device 71 to be described later are, for example, part of a cloud computer. The database 63 corresponds to a recording unit.

The data transceiving unit 65 receives the first vehicle information 17 from the first vehicle 3A. The data transceiving unit 65 receives the second vehicle information 52 from the second vehicle 3B. The data transceiving unit 65 corresponds to a vehicle information receiving unit.

The position information correction unit 67 acquires correction information 73 and corrected position information 75. The process executed by the position information correction unit 67 will be described later. The position information correction unit 67 corresponds to a correction information acquisition unit and a correction unit.

The information providing unit 69 transmits at least a part of the information recorded in the database 63 to the external device 71. The information transmitted to the external device 71 is hereinafter referred to as provided information. The provided information includes the corrected position information 75. The provided information includes, for example, the corrected position information 75 and partial or all of the first vehicle information 17. In the provided information, the corrected position information 75 and partial or all of the first vehicle information 17 are associated with one other. The provided information further includes, for example, partial or all of the second vehicle information 52.

The provided information may include the time information 19A in addition to the corrected position information 75. The corrected position information 75 indicates the position of the first vehicle 3A at the time indicated by the time information 19A. The provided information includes, for example, corrected position information 75 that indicates a position within a region designated by a user.

The external device 71 is a device that can be used by a user. Transmitting the provided information to the external device 71 corresponds to providing the information to the user. Examples of user include OEM manufacturers, third party users, and individual users. For example, the third party user can provide information to application users.

The user can use the provided information, for example, to analyze a travel route. By analyzing the travel route, route search algorithms for navigation systems and parcel delivery services can be improved.

The user can use the provided information, for example, to generate high-precision map, monitor road conditions, handle insurance related tasks, display street maps, and distribute driving video. The high-precision map is a map on which information such as traffic signs and white lines is recorded with high precision. The high-precision map can be used, for example, for autonomous driving.

Examples of road conditions include traffic congestion, construction work, and the presence of fallen objects. Possible use of the provided information in insurance related work may include clarifying vehicle behavior before and after an accident based on the provided information, and use the provided information as evidence of fault ratio. The street map, for example, displays a map together with an image superimposed on the map. The driving video distribution can be provided to general users as a record of travel, for example.

As illustrated in FIG. 2, the control unit 61 includes a microcomputer, which is equipped with a CPU 81, and a semiconductor memory, such as a RAM or ROM (hereinafter, referred to as memory 83).

Each function of the control unit 61 is implemented by executing programs stored in a non-transitory tangible storage medium by the CPU 81. In this example, the memory 83 corresponds to the non-transient tangible storage medium that stores the programs. Further, by executing the program corresponding to the functions of control unit, a method corresponding to the program is executed. The control unit 61 may include one microcomputer or multiple microcomputers.

Figure 5:
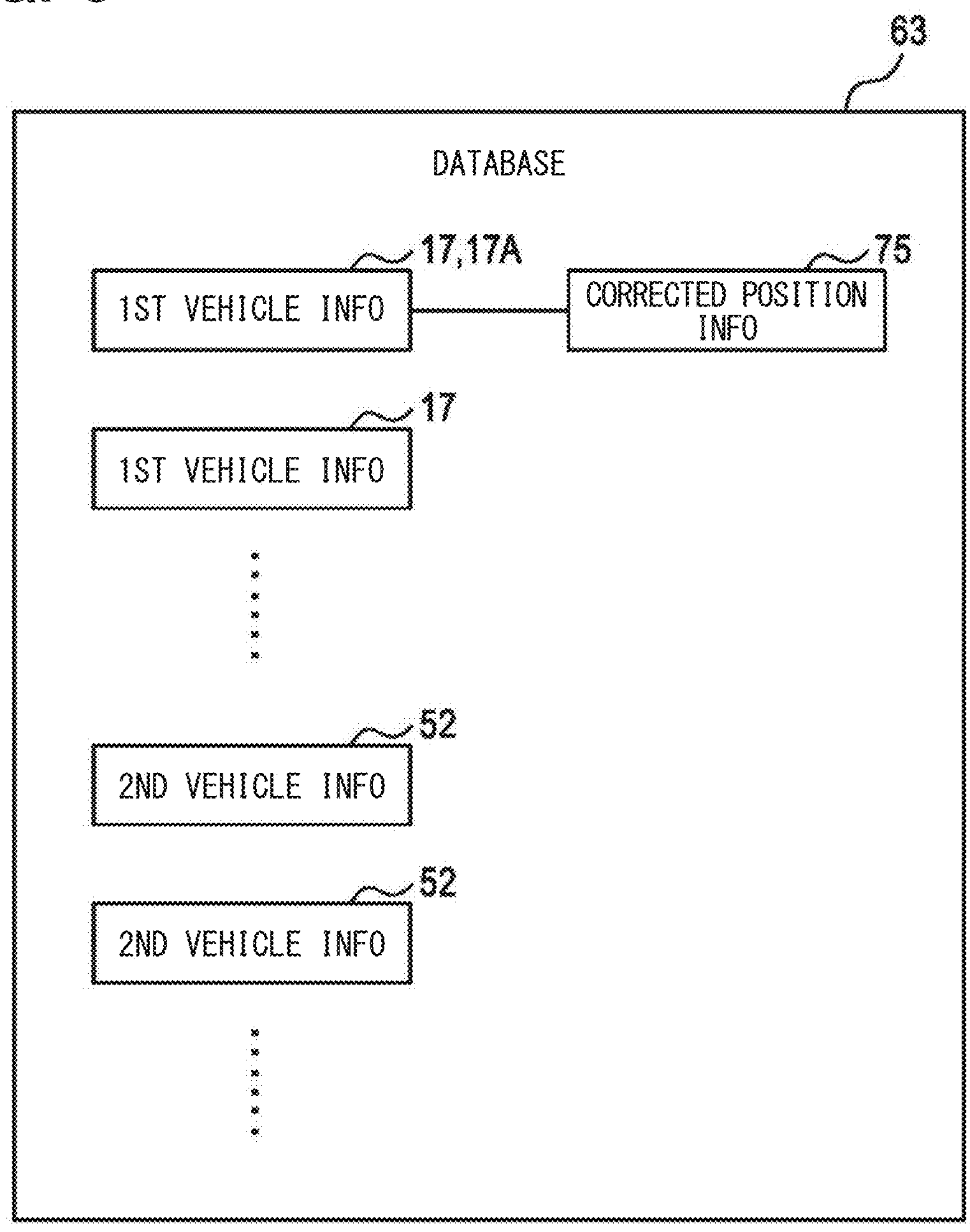
FIG. 5 is an explanatory diagram illustrating information recorded in a database.

The database 63 can record information. As shown in FIG. 5, the database 63 can record the first vehicle information 17 and the second vehicle information 52. The database 63 can record corrected position information 75 in association with the first vehicle information 17.

2. Processes Executed by First Vehicle 3A, Second Vehicle 3B, and Center 5

Figure 6:
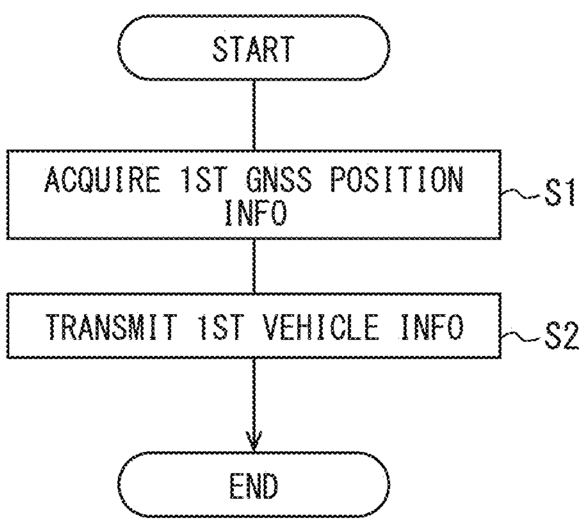
FIG. 6 is a flowchart showing a first vehicle information transmission process.

(2-1) First Vehicle Information Transmission Process Executed by First Vehicle 3A The first vehicle information transmission process executed by the first vehicle 3A will be described with reference to FIG. 6. The first vehicle 3A may repeatedly execute the first vehicle information transmission process at predetermined time intervals. Alternatively, the first vehicle 3A may execute the first vehicle information transmission process in response to a request from the center 5. It should be noted that, when the center 5 receives a request for information from the user, the center 5 requests the first vehicle 3A to execute the first vehicle information transmission process.

For example, the user requests the center 5 to provide information including corrected position information 75 acquired within a predetermined area. In this case, the center 5 requests the first vehicle 3A traveling in the predetermined area to execute the first vehicle information transmission process.

In S1, the GNSS position information acquisition unit 11 acquires the first GNSS position information 15A.

In S2, the data transmission unit 13 transmits the first vehicle information 17 to the center 5. The first vehicle information 17 includes the first GNSS position information 15A acquired in S1. The first vehicle information 17 also includes time information 19A indicating the acquiring time of first GNSS position information 15A acquired in S1.

Figure 7:
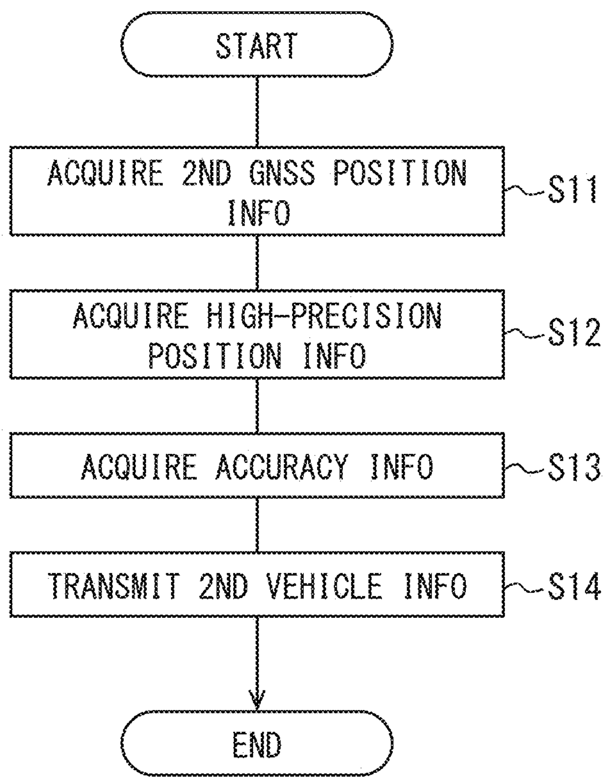
FIG. 7 is a flowchart showing a second vehicle information transmission process.

(2-2) Second Vehicle Information Transmission Process Executed by Second Vehicle 3B The second vehicle information transmission process executed by the second vehicle 3B will be described with reference to FIG. 7. The second vehicle 3B may repeatedly execute the second vehicle information transmission process at predetermined time intervals. Alternatively, the second vehicle 3B may execute the second vehicle information transmission process in response to a request from the center 5. It should be noted that, when the center 5 receives a request for information from the user, the center 5 requests the second vehicle 3B to execute the second vehicle information transmission process.

For example, the user requests the center 5 to provide information including corrected position information 75 acquired within a predetermined area. In this case, the center 5 requests the second vehicle 3B traveling in the predetermined area to execute the second vehicle information transmission process.

In S11, the GNSS position information acquisition unit 39 acquires the second GNSS position information 15B.

In S12, the high-precision position information acquisition unit 41 acquires high-precision position information 51.

In S13, the GNSS position information acquisition unit 39 and the high-precision position information acquisition unit 41 acquire the accuracy information 55.

In S14, the data transmission unit 45 transmits the second vehicle information 52 to the center 5. The second vehicle information 52 includes the second GNSS position information 15B acquired in S11 and the high-precision position information 51 acquired in S12. The second vehicle information 52 further includes time information 19B that indicates the acquiring time of the second GNSS position information 15B acquired in S11 and the acquiring time of the high-precision position information 51 acquired in S12.

(2-3) Vehicle Information Recording Process Executed by Center 5

Figure 8:
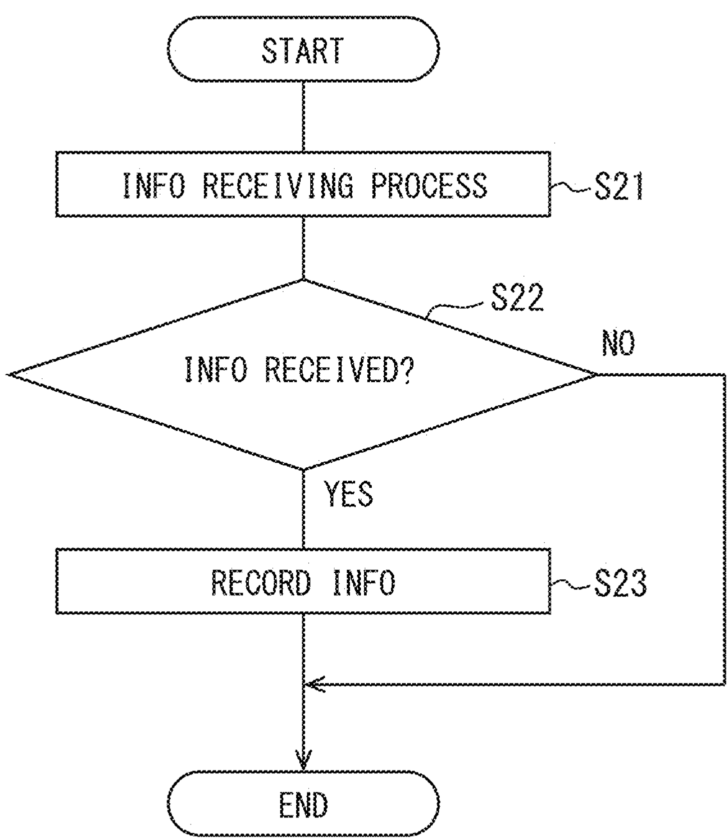
FIG. 8 is a flowchart illustrating vehicle information recording process.

The following will describe a vehicle information recording process repeatedly executed by the center 5 at predetermined time intervals with reference to FIG. 8. In S21, the data transceiving unit 65 executes an information reception process. The information reception process is a process for receiving the first vehicle information 17 transmitted from the first vehicle 3A and the second vehicle information 52 transmitted from the second vehicle 3B.

In S22, the data transceiving unit 65 determines whether the first vehicle information 17 or the second vehicle information 52 is received in S21. In response to determining that the first vehicle information 17 or the second vehicle information 52 is received, the process proceeds to S23. In response to determining that neither the first vehicle information 17 nor the second vehicle information 52 is received, the process is ended.

In S23, the data transceiving unit 65 records, in the database 63, the received first vehicle information 17 and the second vehicle information 52. As a result, as shown in FIG. 5, at least one of the first vehicle information 17 or the second vehicle information 52 is recorded in the database 63.

Among multiple records of the first vehicle information 17 recorded in the database 63, the corrected position information 75 is recorded in association with the first vehicle information 17 that corresponds to the correction target information 17A. Details of the correction target information will be described below. Immediately after the first vehicle information is recorded in the database 63, the corrected position information 75 is not yet associated with the first vehicle information 17.

Note that the receiving and recording of the first vehicle information 17 and the second vehicle information 52 by the center corresponds to collecting information from the first vehicle 3A and the second vehicle 3B by the center.

(2-4) Correction Process Executed by Center 5

Figure 9:
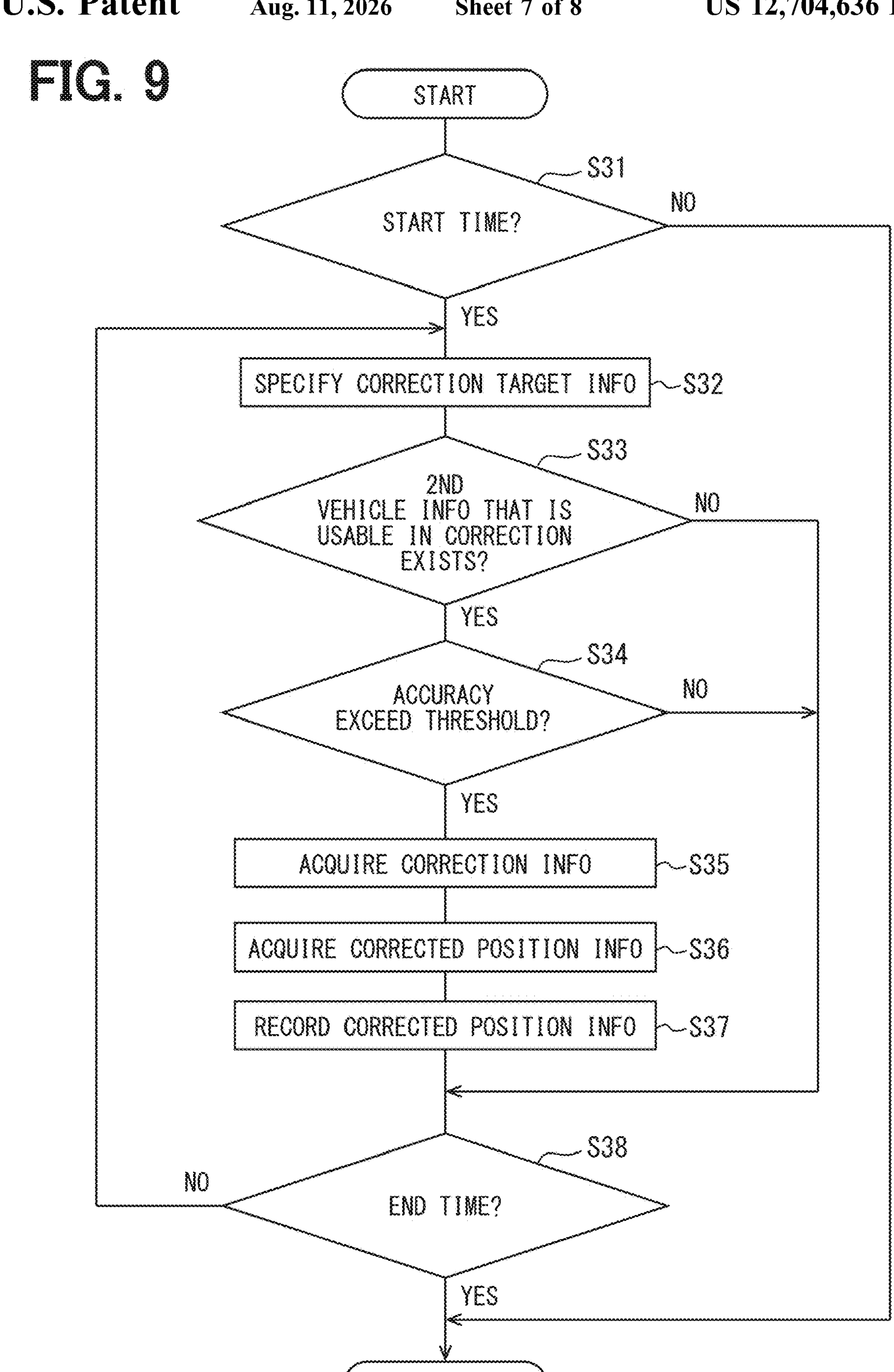
FIG. 9 is a flowchart showing a correction process.
Figures 10, 11, 12:
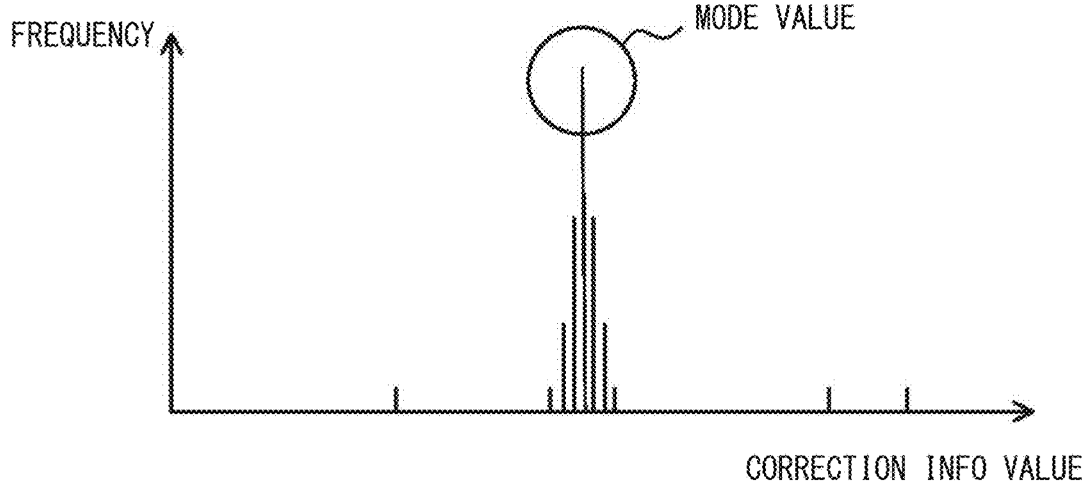
FIG. 10 is an explanatory diagram illustrating an example of correction information.
FIG. 11 is an explanatory diagram illustrating an example of corrected position information.
FIG. 12 is an explanatory diagram showing another method of acquiring correction information.

The following will describe a correction process repeatedly executed by the position information correction unit 67 at predetermined time intervals with reference to FIG. 9 to FIG. 11.

In S31 of FIG. 9, the position information correction unit 67 determines whether the current time is the time at which the correction process should be started (hereinafter referred to as a start time). For example, a time when the control unit 61 has sufficient resources corresponds to the start time. When the provision of information is requested by the user, this corresponds to the start time. In response to determining that the current time is the start time, the process proceeds to S32. In response to determining that the current time is not the start time, the process is ended.

In S32, the position information correction unit 67 specifies the first vehicle information 17 to be corrected (hereinafter referred to as correction target information 17A) from multiple records of the first vehicle information 17 received in S21 and recorded in the database 63 in S23. The correction target information 17A is the first vehicle information 17 with which the corrected position information 75 has not yet been associated. The position information correction unit 67 can distinguish the first vehicle information 17 and the second vehicle information 52 based on the vehicle identification information 21, 53.

In S33, the position information correction unit 67 determines whether the second vehicle information 52 (hereinafter referred to as usable information) that can be used to correct the correction target information 17A is recorded in the database 63. The usable information is the second vehicle information 52 that is received in S21 and recorded in the database 63 in S23. The usable information is the second vehicle information 52 that satisfies the following conditions J1 and J2.

(J1) A difference between the first GNSS position information 15A, which is included in the correction target information 17A, and the second GNSS position information 15B or the high-precision position information 51, which is included in the second vehicle information 52, is less than or equal to a threshold value.

(J2) A difference between the acquiring time of correction target information 17A acquired in the first vehicle 3A and the acquiring time of second vehicle information 52 acquired in the second vehicle 3B is less than or equal to a threshold value.

When the usable information is recorded in the database 63, the process proceeds to S34. When the usable information is not recorded in the database 63, the process proceeds to S38. The usable information is the second vehicle information 52 to be used in acquiring of the correction information 73, which will be described later.

In S34, the position information correction unit 67 reads the usable information from the database 63. When multiple records of usable information are recorded in the database 63, the usable information having the smallest difference between the first GNSS position information 15A, which is included in the correction target information 17A, and the second GNSS position information 15B or the high-precision position information 51, which is included in the usable information, is read from the database 63. Alternatively, the usable information having the smallest difference between the acquiring time of the correction target information 17A acquired in the first vehicle 3A and the acquiring time of the usable information acquired in the second vehicle 3B is read from the database 63.

Next, the position information correction unit 67 determines whether the accuracy indicated by the accuracy information 55 included in the usable information exceeds a threshold value. When the accuracy exceeds the threshold value, the process proceeds to S35. When the accuracy is equal to or less than the threshold value, the process proceeds to S38. That is, when the accuracy indicated by the accuracy information 55 is equal to or lower than the threshold value, the second vehicle information 52 including the accuracy information 55 is not used in acquiring of the correction information 73.

For example, when the accuracy indicated by the accuracy information 55 is "accuracy: low", the second vehicle information 52 including the accuracy information 55 is not used to acquire the correction information 73. Also, for example, if the accuracy value included in the accuracy information 55 is equal to or less than a threshold value, the second vehicle information 52 including the accuracy information 55 is not used to acquire the correction information 73. For example, the range in which the accuracy value can vary is greater than 0 and equal to or less than 1, with the threshold being 0.5.

In S35, the position information correction unit 67 acquires the correction information 73 using the usable information. The correction information 73 indicates the difference between the second GNSS position information 15B included in the usable information and the high-precision position information 51.

An example of the correction information 73 is shown in FIG. 10. In this example, the second GNSS position information 15B included in the usable information has a latitude of 34.9945000 degrees and a longitude of 137.0057000 degrees. The high-precision location information 51 included in the usable information has a latitude of 34.9946000 degrees and a longitude of 137.0058000 degrees.

The contents of correction information 73 include latitude difference obtained by subtracting the latitude of the second GNSS position information 15B from the latitude of the high-precision position information 51 (hereinafter referred to as latitude difference) and longitude difference obtained by subtracting the longitude of the second GNSS position information 15B from the longitude of the high-precision position information 51 (hereinafter referred to as longitude difference). In the example shown in FIG. 10, the latitude difference is 0.0001000 degrees. The longitude difference is 0.0001000 degrees.

In S36, the position information correction unit 67 calculates the corrected position information 75 using the first GNSS position information 15A included in the correction target information 17A and the correction information 73 acquired in S35. The corrected position information 75 indicates the position of first vehicle 3A at the acquiring time of the correction target information 17A. The corrected position information 75 is position information with higher accuracy than the first GNSS position information 15A included in the correction target information 17A.

For example, in the example shown in FIG. 11, the first GNSS position information 15A included in the correction target information 17A has a latitude of 34.9947000 degrees and a longitude of 137.0058000 degrees.

The latitude in the corrected position information 75 is the latitude obtained by subtracting the latitude difference from the latitude in the first GNSS position information 15A. The longitude in the corrected position information 75 is the longitude obtained by subtracting the longitude difference from the longitude in the first GNSS position information 15A. In the example shown in FIG. 11, the corrected position information 75 includes latitude of 34.9946000 degrees and longitude of 137.0057000 degrees.

In S37, as shown in FIG. 5, the position information correction unit 67 records, in the database 63, the corrected position information 75 calculated in S36. The corrected position information 75 is associated with the correction target information 17A.

In S38, the position information correction unit 67 determines whether the current time is the time to end the correction process (hereinafter referred to as an end time). For example, when the control unit 61 has insufficient resources, the process may determine the current time corresponds to the end time. When the corrected position information 75 is generated for all of the first vehicle information 17 recorded in the database 63, the process may determine the current time corresponds to the end time. In response to determining that the current time is the end time, the process is ended. In response to determining that the current time is not the end time, the process returns to S32.

(2-5) Vehicle Information Providing Process Executed by Center 5

In response to a request from the user, the information providing unit 69 reads out the provided information from the database 63 and transmits the provided information to the external device 71. The above processes described in (2-3) to (2-5) correspond to managing of the information to be provided to the user.

3. Effects Provided by Information Management System 1

(1A) The information management system 1 can record highly accurate corrected position information 75 and provide the corrected position information to the user without necessarily correcting the first GNSS position information 15A in each of the first vehicles 3A when there are multiple first vehicles 3A.

(1B) The center 5 determines whether there is a shortage of resources in the computer that functions as the position information correction unit 67. In response to determining that there is no shortage of resources, the center performs the correction process and calculates the corrected position information 75. Thus, it is possible to prevent the correction process from causing a shortage of computer resources.

(1C) The center 5 calculates the corrected position information 75 when the providing of first vehicle information 17 is requested by the user. Therefore, the resources of the computer functioning as the position information correction unit 67 can be effectively utilized.

(1D) The second vehicle information 52 includes the accuracy information 55. When the accuracy indicated by the accuracy information 55 is equal to or lower than the threshold value, in acquiring of the correction information 73, the center 5 does not use the second vehicle information 52 including the accuracy information 55. Thus, the accuracy of corrected position information 75 can be further improved.

(1E) The center 5 acquires the correction information 73 using the second vehicle information 52 that satisfies the conditions J1 and J2 related to the correction target information 17A. The correction target information 17A and the second vehicle information 52 that satisfy the conditions J1 and J2 are close in location and acquisition time. Thus, when the second vehicle information 52 that satisfies the conditions J1 and J2 is used, the accuracy of corrected position information 75 can be further improved.

Other Embodiments

Although the embodiments of the present disclosure have been described above, the present disclosure is not limited to the embodiments described above, and various modifications can be made to implement the present disclosure.

(1) The method of acquiring correction information 73 may be performed as follows. In S35, the process acquires multiple records of correction information 73. The multiple records of correction information 73 are calculated based on the multiple records of usable information, respectively. The multiple records of usable information may be multiple records of information transmitted by the same second vehicle 3B at multiple locations. Alternatively, the multiple records of usable information may be transmitted from multiple second vehicles 3B when they are positioned in the same location or positioned within a limited range.

As shown in FIG. 12, a histogram of multiple records of correction information 73 is generated. In FIG. 12, the horizontal axis represents the value of correction information 73, and the vertical axis represents the frequency as a result of the calculation. The correction information 73 of the most frequent value (i.e., the mode) in the histogram may be adopted as the correction information 73 to be used in the process of S36. With this configuration, the accuracy of corrected position information 75 can be further improved.

(2) The method of acquiring the high-precision position information 51 by the high-precision position information acquisition unit 41 may be different from the above-described method. For example, the high-precision position information 51 may be acquired by using a Differential Global Positioning System (DGPS).

(3) The second vehicle 3B may transmit the second GNSS position information 15B and the correction information 73 to the center 5. The second vehicle 3B may transmit the high-precision position information 51 and the correction information 73 to the center 5. The second vehicle 3B may be configured to acquire the correction information in a manner similar to that of S35 described above. The center 5 can calculate the corrected position information 75 using the correction information 73 received from the second vehicle 3B.

(4) The control unit 61 and the method thereof described in the present disclosure may be implemented by a dedicated computer provided by configuring a processor and a memory programmed to execute one or more functions provided by a computer program. Alternatively, the control unit 61 and the method thereof described in the present disclosure may be implemented by a dedicated computer provided by configuring a processor with one or more dedicated hardware logic circuits. Alternatively, the control unit 61 and the method thereof described in the present disclosure may be implemented by one or more dedicated computers configured by a combination of a processor and a memory programmed to execute one or more functions and a processor configured by one or more hardware logic circuits. The computer program may be stored in a computer-readable non-transitory tangible storage medium as instructions to be executed by a computer. The control unit 61 and the method thereof described in the present disclosure does not necessarily need to include software, and all of the functions may be implemented using one or more hardware circuits.

(5) Multiple functions of one configuration element in the above embodiment may be implemented by multiple configuration elements, or a single function of one configuration element may be implemented by multiple configuration elements. Multiple functions of multiple configuration elements may be implemented by one configuration element, or one function implemented by multiple configuration elements may be implemented by one configuration element. A part of the configuration of the above embodiments may be omitted as appropriate. At least a part of the configuration in one embodiment may be added to or substituted for the configuration of another embodiment.

(6) The present disclosure can be implemented not only by the above-described information management system 1 but also by various aspects, such as a high-order system using the information management system as a component, a program for causing a computer to function as the control unit 61, a non-transitory tangible storage medium such as a semiconductor memory in which the program is recorded, an information collecting method, and an information processing method.

What is claimed is:

1. An information management system comprising:

a first vehicle;

a second vehicle; and a center, the information management system managing information provided from the center to a user, wherein the first vehicle includes a first vehicle information transmission unit configured to transmit, to the center, first vehicle information including first global navigation satellite system (GNSS) position information indicative of a position of the first vehicle, the second vehicle includes a second vehicle information transmission unit configured to transmit, to the center, second vehicle information including second GNSS position information indicative of a position of the second vehicle and high-precision position information indicative of the position of the second vehicle, the high-precision position information has a higher accuracy than an accuracy of the second GNSS position information, and the center includes:

a vehicle information receiving unit receiving the first vehicle information transmitted from the first vehicle information transmission unit and the second vehicle information transmitted from the second vehicle information transmission unit;

a correction information acquisition unit acquiring correction information that indicates a difference between the second GNSS position information and the high-precision position information, the second GNSS position information and the high-precision position information are included in the second vehicle information received by the vehicle information receiving unit;

a correction unit calculating corrected position information indicative of the position of the first vehicle using the first GNSS position information included in the first vehicle information received by the vehicle information receiving unit and the correction information acquired by the correction information acquisition unit, the corrected position information has a higher accuracy than an accuracy of the first GNSS position information;

a recording unit recording the first vehicle information, the second vehicle information, and the corrected position information calculated by the correction unit; and an information providing unit transmitting, to an external device that is usable by the user, the information recorded in the recording unit in response to a request from the user.

2. The information management system according to claim 1, wherein the correction unit determines whether a resource of a computer, which functions as the correction unit, is insufficient, and in response to determining that the resource of the computer is not insufficient, the correction unit calculates the corrected position information.

3. The information management system according to claim 1, wherein the correction unit calculates the corrected position information in response to a request for information providing being received from the user.

4. The information management system according to claim 1, wherein the second vehicle information further includes accuracy information indicative of an accuracy of at least one of the second GNSS position information or the high-precision position information, and in acquiring of the correction information, the correction information acquisition unit does not use the second vehicle information including the accuracy information when an accuracy indicated by the accuracy information is equal to or less than a threshold value.

5. The information management system according to claim 1, wherein the correction information acquisition unit acquires multiple records of the correction information and adopts a most frequent value among the acquired multiple records of the correction information as the correction information to be used in correction.

6. The information management system according to claim 1, wherein the correction information acquisition unit acquires the correction information by using the second vehicle information that satisfies following conditions J1 and J2:

(J1) a difference between (i) the first GNSS position information included in the first vehicle information and (ii) the second GNSS position information or the high-precision position information, which is included in the second vehicle information, is equal to or less than a threshold value; and (J2) a difference between (i) an acquiring time of the first vehicle information and (ii) an acquiring time of the second vehicle information is equal to or less than a threshold value.

7. A center receiving information transmitted from a first vehicle and a second vehicle and managing information to be provided to a user, the first vehicle being configured to transmit, to the center, first vehicle information including first GNSS position information indicative of a position of the first vehicle, the second vehicle being configured to transmit, to the center, second vehicle information including second GNSS position information indicative of a position of the second vehicle and high-precision position information indicative of the position of the second vehicle, the high-precision position information having a higher accuracy than an accuracy of the second GNSS position information, the center comprising:

a vehicle information receiving unit receiving the first vehicle information transmitted from the first vehicle and the second vehicle information transmitted from the second vehicle;

a correction information acquisition unit acquiring correction information, which indicates a difference between the second GNSS position information and the high-precision position information, the second GNSS position information and the high-precision position information being included in the second vehicle information received by the vehicle information receiving unit;

a correction unit calculating corrected position information indicative of the position of the first vehicle using the first GNSS position information included in the first vehicle information received by the vehicle information receiving unit and the correction information acquired by the correction information acquisition unit, the corrected position information having a higher accuracy than an accuracy of the first GNSS position information;

a recording unit recording the first vehicle information, the second vehicle information, and the corrected position information calculated by the correction unit; and an information providing unit transmitting, to an external device that is usable by the user, the information recorded in the recording unit in response to a request from the user.

8. An information management method of collecting information from a first vehicle and a second vehicle and managing information to be provided to a user, the information management method comprising:

collecting, from the first vehicle, first vehicle information including first GNSS position information indicative of a position of the first vehicle;

collecting, from the second vehicle, second vehicle information including second GNSS position information indicative of a position of the second vehicle and high-precision position information indicative of the position of the second vehicle, the high-precision position information having a higher accuracy than an accuracy of the second GNSS position information;

acquiring correction information, which indicates a difference between the second GNSS position information and the high-precision position information, the second GNSS position information and the high-precision position information being included in the second vehicle information;

calculating corrected position information indicative of the position of the first vehicle using the first GNSS position information included in the first vehicle information and the correction information, the corrected position information having a higher accuracy than an accuracy of the first GNSS position information;

recording the first vehicle information, the second vehicle information, and the corrected position information; and in response to a request from the user, transmitting the first vehicle information, the second vehicle information, and the corrected position information, which are recorded, to an external device that is usable by the user.

9. A computer-readable non-transitory storage medium storing a program, the program including instructions to be executed by a computer of a center, the center receiving information transmitted from a first vehicle and a second vehicle and managing information to be provided to a user, the first vehicle being configured to transmit, to the center, first vehicle information including first GNSS position information indicative of a position of the first vehicle, the second vehicle being configured to transmit, to the center, second vehicle information including second GNSS position information indicative of a position of the second vehicle and high-precision position information indicative of the position of the second vehicle, the high-precision position information having a higher accuracy than an accuracy of the second GNSS position information, the instructions comprising:

collecting, from the first vehicle, first vehicle information including first GNSS position information indicative of a position of the first vehicle;

collecting, from the second vehicle, second vehicle information including second GNSS position information indicative of a position of the second vehicle and high-precision position information indicative of the position of the second vehicle, the high-precision position information having a higher accuracy than an accuracy of the second GNSS position information;

acquiring correction information, which indicates a difference between the second GNSS position information and the high-precision position information, the second GNSS position information and the high-precision position information being included in the second vehicle information;

calculating corrected position information indicative of the position of the first vehicle using the first GNSS position information included in the first vehicle information and the correction information, the corrected position information having a higher accuracy than an accuracy of the first GNSS position information;

recording the first vehicle information, the second vehicle information, and the corrected position information; and in response to a request from the user, transmitting the first vehicle information, the second vehicle information, and the corrected position information, which are recorded, to an external device that is usable by the user.

* * * * *